United States Patent
Frantz et al.

(10) Patent No.: US 10,350,633 B2
(45) Date of Patent: Jul. 16, 2019

(54) COMPOSITES AND COATINGS CONTAINING MULTILAYER POLYMER FLAKES FOR ENGINEERED REFLECTIVE PROPERTIES

(71) Applicant: The United States of America, as represented by the Secretary of the Navy, Washington, DC (US)

(72) Inventors: Jesse A. Frantz, Landover, MD (US); Lynda E. Busse, Alexandria, VA (US); Leslie Brandon Shaw, Woodbridge, VA (US); Jasbinder S. Sanghera, Ashburn, VA (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 210 days.

(21) Appl. No.: 15/255,511

(22) Filed: Sep. 2, 2016

(65) Prior Publication Data
US 2017/0066926 A1 Mar. 9, 2017

Related U.S. Application Data

(60) Provisional application No. 62/214,241, filed on Sep. 4, 2015.

(51) Int. Cl.
| | |
|---|---|
| *B05D 3/00* | (2006.01) |
| *C09D 133/12* | (2006.01) |
| *C09D 125/06* | (2006.01) |
| *C09D 175/04* | (2006.01) |
| *B32B 27/10* | (2006.01) |
| *B32B 27/18* | (2006.01) |
| *B32B 27/30* | (2006.01) |
| *B32B 27/32* | (2006.01) |
| *B32B 27/36* | (2006.01) |
| *B32B 27/38* | (2006.01) |
| *B32B 27/40* | (2006.01) |
| *C09D 5/33* | (2006.01) |
| *B05D 5/06* | (2006.01) |
| *G02B 5/20* | (2006.01) |
| *G02B 5/28* | (2006.01) |

(52) U.S. Cl.
CPC ............ *B05D 3/007* (2013.01); *B05D 5/063* (2013.01); *B32B 27/10* (2013.01); *B32B 27/18* (2013.01); *B32B 27/30* (2013.01); *B32B 27/302* (2013.01); *B32B 27/304* (2013.01); *B32B 27/308* (2013.01); *B32B 27/32* (2013.01); *B32B 27/36* (2013.01); *B32B 27/38* (2013.01); *B32B 27/40* (2013.01); *C09D 5/004* (2013.01); *C09D 125/06* (2013.01); *C09D 133/12* (2013.01); *C09D 175/04* (2013.01); *G02B 5/206* (2013.01); *G02B 5/208* (2013.01); *G02B 5/283* (2013.01); *B32B 2255/00* (2013.01); *B32B 2255/26* (2013.01); *B32B 2264/00* (2013.01); *B32B 2264/02* (2013.01); *B32B 2307/40* (2013.01); *B32B 2307/416* (2013.01); *B32B 2307/418* (2013.01)

(58) Field of Classification Search
CPC .... C09D 5/006; C09D 133/12; C09D 125/06; C09D 175/04; B05D 1/02; B05D 3/007
USPC ........................................................ 428/323
See application file for complete search history.

(56) References Cited

U.S. PATENT DOCUMENTS

| | | | |
|---|---|---|---|
| 3,773,882 A | 11/1973 | Schrenk | |
| 3,884,606 A | 5/1975 | Shrenk | |
| 5,059,245 A | 10/1991 | Phillips et al. | |
| 5,084,352 A | 1/1992 | Percec et al. | |
| 5,135,812 A | 8/1992 | Phillips et al. | |
| 5,383,995 A | 1/1995 | Phillips et al. | |
| 5,540,978 A * | 7/1996 | Schrenk ................... | B32B 7/02 428/212 |
| 6,475,609 B1 | 11/2002 | Whitney et al. | |
| 7,608,330 B2 | 10/2009 | Argoitia et al. | |
| 8,313,798 B2 | 11/2012 | Nogueira et al. | |
| 2010/0098844 A1 | 4/2010 | Pettinger | |

OTHER PUBLICATIONS

N. S. Sodhi, "Competition in the Air: Birds Versus Aircraft," The Auk 119, 587 (2002).
"Wildlife Strikes to Civil Aircraft in the United States 1990-2013," Federal Aviation Administration National Wildlife Strike Database, Serial Report #20 (2014).
S. R. Loss, T. Will, S. S. Loss, and P. P. Marra, "Bird-Building Collisions in the United States: Estimates of Annual Mortality and Species Vulnerability," The Condor 116, 8-23 (2014).
"Ornilux Bird Protection Glass," http://www.ornilux.com/Attachments/ORNILUX_Flyer_2014.pdf.

* cited by examiner

*Primary Examiner* — Hui H Chin
(74) *Attorney, Agent, or Firm* — US Naval Research Laboratory; Rebecca L. Forman (57) ABSTRACT

A composite and a coating having engineered reflective properties are described. The composite comprises a matrix and flakes of a multilayer polymer film including one or more bilayers including at least a layer of a first polymer and a layer of a second polymer having a different refractive index than the first polymer. The coating described includes the composite as applied to a surface and has a reflectance of at least 10% for a selected wavelength range and a transmittance of at least 50% at wavelengths outside of the selected wavelength range. Also described are methods for forming the composite and the coating.

23 Claims, 7 Drawing Sheets

COMPOSITES AND COATINGS CONTAINING MULTILAYER POLYMER FLAKES FOR ENGINEERED REFLECTIVE PROPERTIES

RELATED APPLICATIONS

This application claims the benefit of U.S. provisional application No. 62/214,241, filed Sep. 4, 2015.

TECHNICAL FIELD

A composite and a coating comprising flakes of multilayer polymer films, suspended within a paint matrix is described. The composite and the coating have controlled reflective properties over a desired spectral range and are substantially transparent at other wavelengths of the optical spectrum. Also disclosed are methods of fabricating the composite and the coating.

BACKGROUND

For a variety of different applications, it is desirable to coat a surface with a paint that has specified reflective properties for some wavelengths of light while it remains transparent or substantially transparent to others. For instance, bird strikes are a significant problem for aeronautical applications, and in the most severe cases have led to well-documented crashes. See, N. S. Sodhi, "Competition in the Air: Birds Versus Aircraft," *The Auk* 119, 587 (2002) and "Wildlife Strikes to Civil Aircraft in the United States 1990-2013," Federal Aviation Administration National Wildlife Strike Database, Serial Report #20 (2014). These situations arise, in part, from the fact that birds use ultraviolet (UV) light to detect obstacles and most man-made flying objects have low reflectivity in the UV spectrum. A paint that reflects UV light that could be applied to an aerial vehicle's body, windows, and engine parts without significantly changing the visible appearance of the vehicle could reduce the likelihood of bird strikes and therefore improve flight safety. It has been previously disclosed in, for example, U.S. Patent Publication No. 2010/0098844A1 that UV reflective coatings on a variety of surfaces could enhance both human and bird safety.

Furthermore, a large number of birds die as a result of flying into windows on commercial and residential buildings. The ecological impact of this situation is huge, with estimates placing the number of bird deaths resulting from window collisions in the range of 365 to 988 million per year in the United States alone. See, S. R. Loss, T. Will, S. S. Loss, and P. P. Marra, "Bird-Building Collisions in the United States: Estimates of Annual Mortality and Species Vulnerability," *The Condor* 116, 8-23 (2014). A paint for windows that provides UV reflectivity while leaving the window visibly transparent could reduce the number of these collisions. One method has been proposed that uses a UV reflective structure embedded in the glass, see for example, "Ornilux Bird Protection Glass," http://www.ornilux.com/Attachments/ORNILUX_Flyer_2014.pdf. However, this technology is costly and cannot be used to retrofit existing windows.

Paints with controlled reflectivity could be useful for a variety of other applications as well. They could, for instance, be applied as decorative coatings. Traditional paints reflect light in one or more spectral bands, resulting in their color. However, there are instances when more complex spectral properties are desired. For instance, a paint could be made to reflect a specific color for a certain angular range, adding an interesting visual effect that could be described as a "sparkle" or "glitter". Alternately, a coating that offers high reflectivity over a controlled band could provide a higher degree of color purity than traditional paint, providing, for example, a coating that appears to be a brighter red than ordinary red paint.

Paints containing reflective flakes have been disclosed previously. For example, see U.S. Pat. Nos. 7,608,330, 5,059,245, 5,084,352, 5,135,812, and 5,383,995. These rely on vacuum deposition onto a "web," which is a substrate layer. These methods are best suited for coatings that require a single or a few layers. For more complex coatings that require many layers and are thus thicker, vacuum deposition on a web is impractical because it is slow and costly. It has been previously disclosed that a polymer stack may be designed to reflect UV light, see U.S. Pat. No. 5,540,978. Such a stack can be engineered to have reflectivity at a desired wavelength, transmissivity at others, potentially with these properties varying with incident angle.

The present invention utilizes aspects of technologies previously known and to provide a novel coating that comprises flakes of polymer films, suspended within a paint matrix. The films are obtained from multilayer polymer stacks or films that use thin film interference in order to achieve the desired reflective properties. Alterations to the present coating as discussed in detail below are able to provide a wide variety of reflective properties.

SUMMARY OF THE INVENTION

The present disclosure relates to a composite material having engineered reflective properties that comprises a matrix and flakes of a multilayer polymer film including one or more bilayers, each bilayer including at least a layer of a first polymer and a layer of a second polymer, and the first polymer has a different refractive index than the second polymer. Preferably, the composite comprises from one to 1024 bilayers.

Another embodiment of the invention is related to a coating formed by the application of the composite of any of the embodiments herein to a surface, wherein the coating has a reflectance of at least 10% for a selected wavelength range and a transmittance of at least 50% at wavelengths outside of the selected wavelength range.

In each of the foregoing embodiments, the mean angle of alignment of the flakes with the outer surface of the coating is less than 45°.

A further embodiment of the invention is a method of forming a stack or polymer film comprised of one to about 1024 bilayers of a first polymer having a first refractive index and a second polymer having a second refractive index different from the first refractive index, comminuting the stack of film to form flakes and dispersing the flakes in a matrix. The flakes may be sieved to obtain flakes within a desired size range prior to dispersing the flakes within the matrix.

Another embodiment of the invention includes a method of forming a coating by applying the composite to a surface and drying or curing the matrix. Preferably, the applying step includes painting or spraying, and the angle of alignment of the flakes with the outer surface of the coating is less than 45°.

In each of the foregoing embodiments, the optical thickness of each polymer layer is from about 10% to about 50% of the wavelength at which the peak reflectance is desired.

In each of the foregoing embodiments, the composite may also comprise a support layer having a thickness between 0.5 µm and 100 µm.

In each of the embodiments, the first polymer and the second polymer may be selected from polymethyl methacrylate, polystyrene, polyvinylidene fluoride, polycarbonate, and polyethylene. Preferably, the first polymer is polymethyl methacrylate and the second polymer is polystyrene.

In each of the foregoing embodiments, the matrix may be either a paint base, or a UV-curable epoxy, and preferably the paint base is a gloss polyurethane.

In each of the foregoing embodiments, the flakes of polymer film have a reflectance of at least 10% within a selected range of wavelengths and the matrix has at least a 50% transmittance outside of the selected range of wavelengths.

In each of the foregoing embodiments, the thickness of a polymer layer in one bilayer is different than the thickness of the polymer layer of a second bilayer. In the foregoing embodiments, at least three bilayers include polymer layers of different thicknesses. Preferably, the thickness of the first polymer layer in a bilayer is equal to t1 and the thickness of the second polymer layer in that bilayer is t2, and for a second bilayer, the first polymer thickness is equal to a*t1 and the second polymer thickness is equal to a*t2, wherein a is a value other than 1.0 between 0.5 and 1.5. For a third bilayer, the first thickness may be equal to b*t1 and the second thickness may be equal to b*t2, wherein b is a value other than 1.0 between 0.5 and 1.5.

In each of the foregoing embodiments, the selected wavelength may be in the UV spectrum.

Each of the foregoing embodiments may comprise multiple different types of polymer flakes.

Additional details and advantages of the disclosure will be set forth in part in the description which follows, and/or may be learned by practice of the disclosure. The details and advantages of the disclosure may be realized and attained by means of the elements and combinations particularly pointed out in the appended claims. It is to be understood that both the foregoing general description and the following detailed description are exemplary and explanatory only and are not restrictive of the disclosure, as claimed.

DETAILED DESCRIPTION

In one aspect, the present invention relates to a composite comprising a matrix and polymer flakes. The flakes are flakes of a multilayer polymer film including one or more bilayers. Each bilayer of the polymer film includes at least a layer of a first polymer and a layer of a second polymer and wherein said first polymer has a different refractive index than the second polymer.

Figure 1:
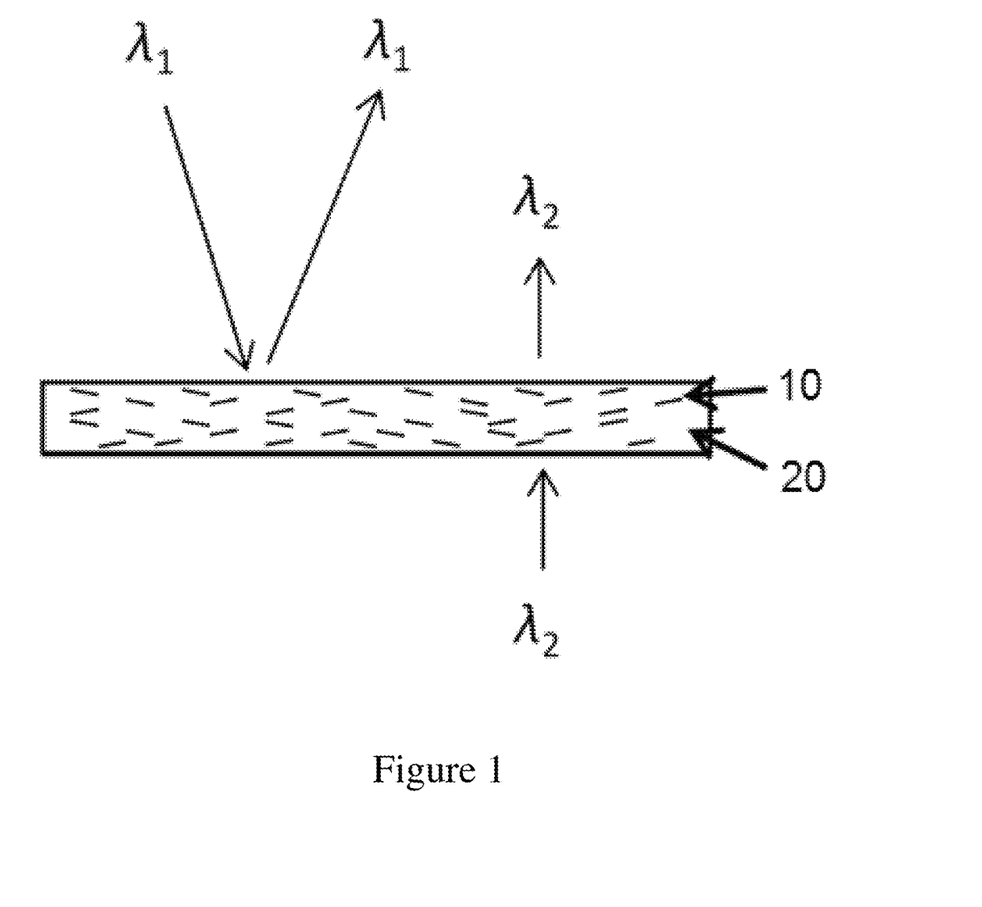
FIG. 1 is a schematic diagram showing a representative edge on view of a cross-section of a paint layer of an embodiment of the present invention.

FIG. 1 shows a schematic diagram of such a composite. FIG. 1 shows the polymer flakes 10 suspended within the matrix 20. Light with a particular wavelength, $\lambda_1$ is reflected, while light with another wavelength, $\lambda_2$ is transmitted.

The present invention also relates to a coating applied to a surface comprising polymer flakes suspended in a paint matrix. In an aspect of the invention the coating may be made for anti-bird strike applications. For anti-bird strike applications, $\lambda_1$ lies within the portion of the UV spectrum visible to birds, in approximately the 300-400 nm wavelength range. For other applications, $\lambda_1$ may lie anywhere in the transparency range of the matrix, including the UV, visible and infrared regions. The flakes have some degree of alignment with the surface of the coating. Each individual flake may not be perfectly aligned with the surface; however the mean angle between the normal to the flake surface and the coating surface should be <45°.

In one embodiment, the polymer film is fabricated by choosing two or more polymers to form a stack of layers of polymers. The polymers selected should each have optical properties that are selected such that the combination provides the desired optical properties for the coating. Preferably, each polymer should have transparency in the wavelength range of interest for both the reflected and transmitted spectra. Preferably, the polymer is selected from polymethyl methacrylate (PMMA), polystyrene (PS), polyvinylidene fluoride (PVDF), polycarbonate (PC), and polyethylene (PE). Two polymers, Polymer 1 and Polymer 2, having differing refractive indices, n1 and n2 respectively, in the spectral range of interest are chosen. The spectral range of interest can be selected from any range of the electromagnetic spectrum. Preferably, the range of interest is in the UV range of the spectrum and is between 100 nm and 400 nm, more preferably the range of interest is between 300 nm and 400 nm. Simulations are carried out using FilmStar modelling software (FTG Software Associates) with known property values to determine what layer thicknesses are required to have the desired reflective properties. The determined thicknesses, t1 and t2, respectively may be chosen such that the optical thickness of the layers, given by n1×t1 and n2×t2 respectively are between about 10% to about 50% of the wavelength at which peak reflectance is desired, more preferably the optical thicknesses are chosen such that they are each approximately 25% of the wavelength at which peak reflectance is desired.

Figure 2:
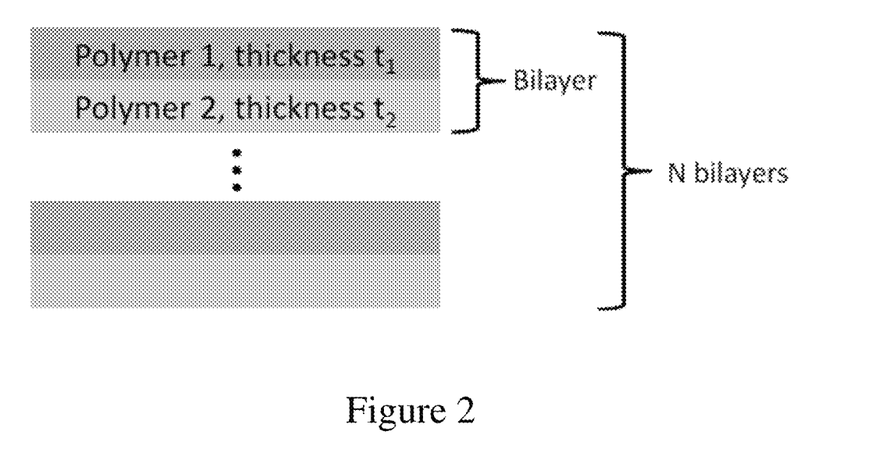
FIG. 2 is a schematic diagram of a polymer stack according to an embodiment of the present invention.
Figure 3:
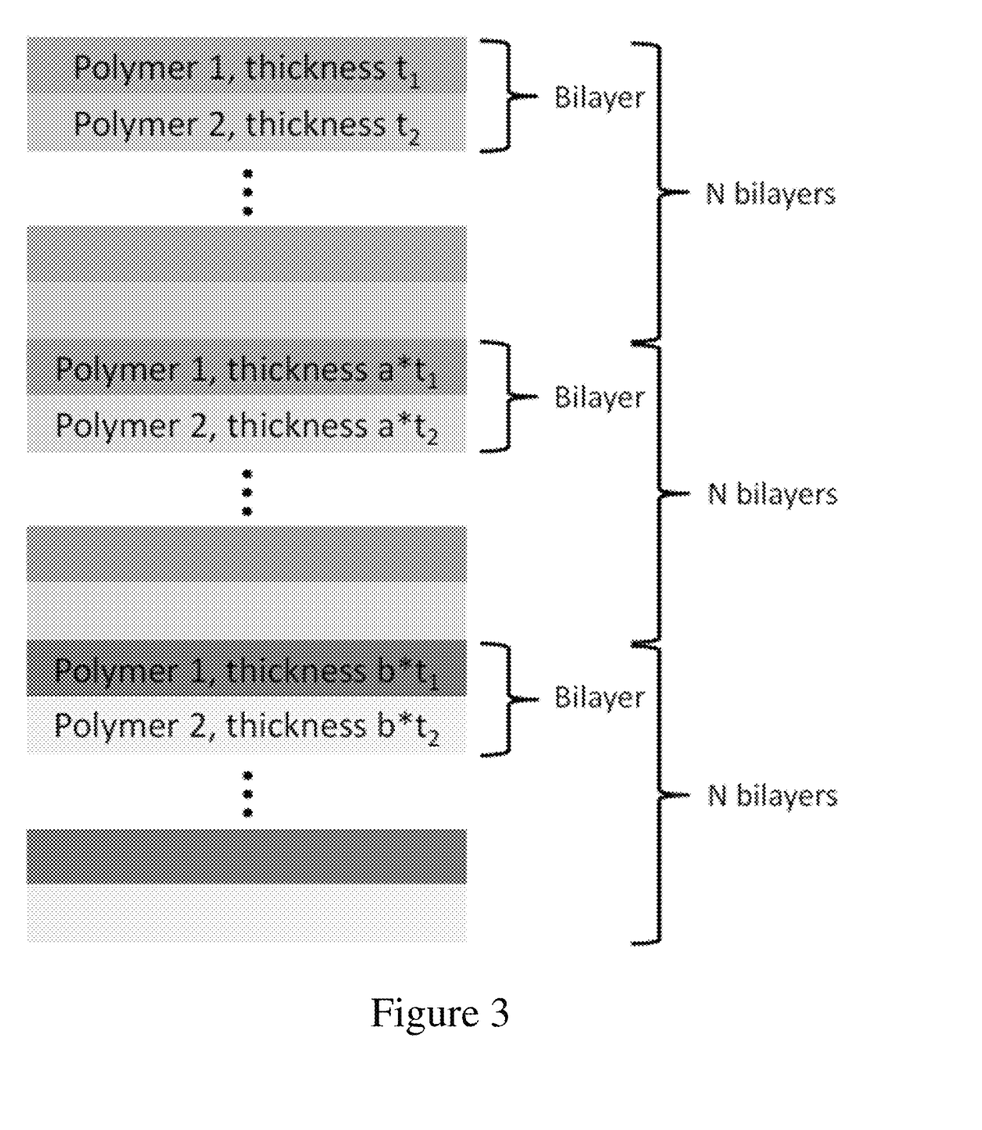
FIG. 3 is a schematic diagram of a polymer stack according to a second embodiment of the present invention.

In the simplest case, for each bilayer, Polymer 1 has thickness t1, and Polymer 2 has thickness t2. In more complex cases, the thickness may be chirped in order to broaden the spectral range of reflectivity. i.e., for one set of bilayers, Polymer 1 has thickness t1, and Polymer 2 has thickness t2, while for another set, Polymer 1 has thickness a*t1, and Polymer 2 has thickness a*t2, and for a third set, Polymer 1 has thickness b*t1, and Polymer 2 has thickness b*t2, etc. where the constants a and b have values other than 1.0 between 0.5 and 1.5. Schematic diagrams of each of these cases are shown in FIGS. 2 and 3 where FIG. 2 shows a single bilayer spacing and FIG. 3 shows three different bilayer spacings created by polymer layers of three different thicknesses.

Once the polymer thickness(es) are determined, a stack with between one and 1024 bilayers (one bilayer consists of one layer each of the two polymers) is formed. Preferably, the stack has between 4 and 1024 bilayers, and more preferably, the stack has between 16 and 256 bilayers. The number of bilayers is selected based on the desired reflectance spectrum; a larger number of bilayers may lead to a more narrow reflectance spectrum with a higher peak reflectance, but a larger number of layers may also lead to lower transmittance and a larger variation in reflectance across the surface due to limitations of thickness control during manufacturing. A larger number of bilayers results in increased reflectance of the desired wavelength to be reflected, or of a range of wavelengths including the desired wavelength to be reflected. In practice, the desired wavelength to be reflected typically represents a wavelength at which the highest reflectivity is achieved and there is also reflectivity at other wavelengths close to the desire wavelength, as shown, for example, in FIG. 4.

Figure 4:
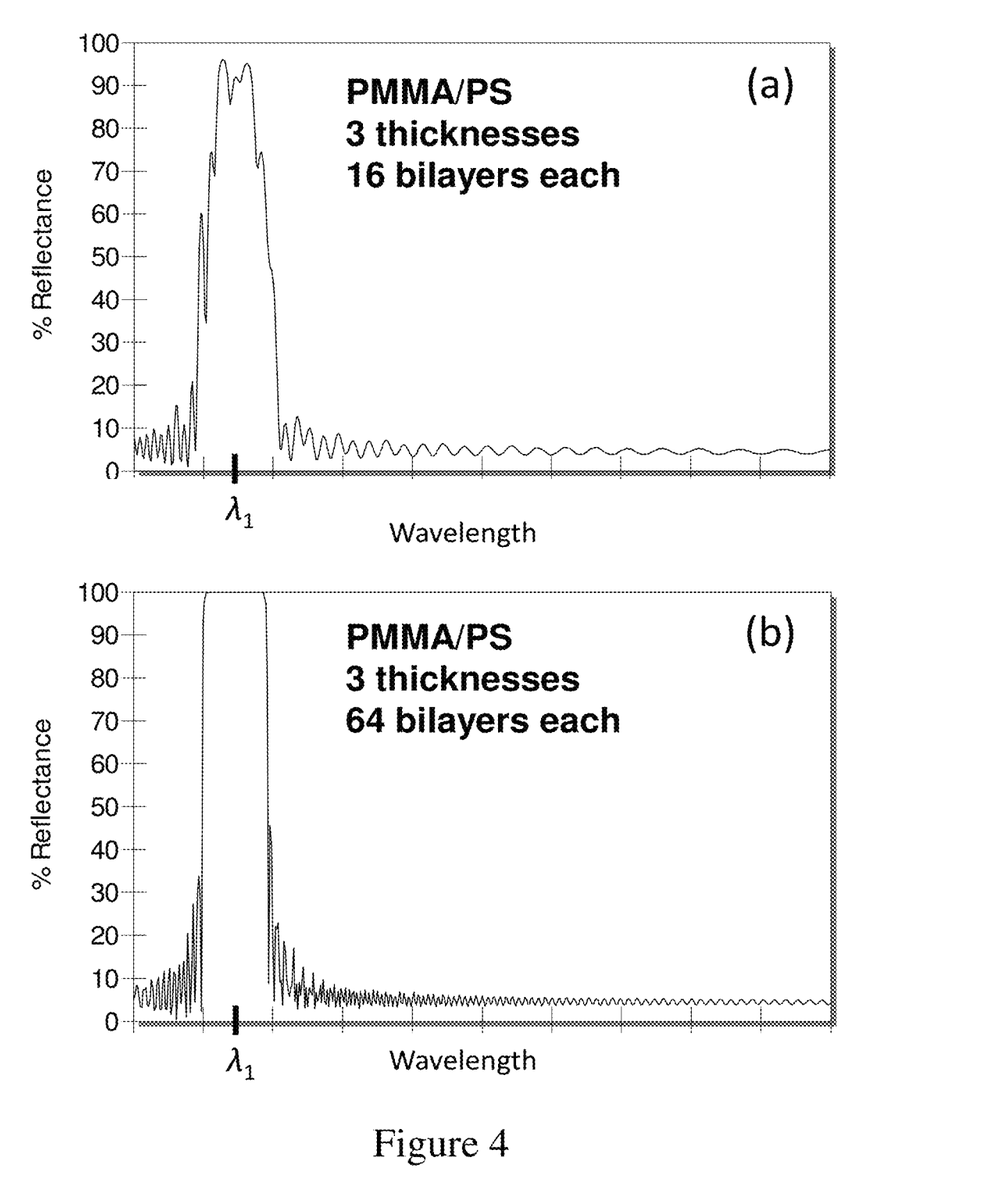
FIG. 4 shows calculated reflectance spectra at normal incidence for PMMA/PS stacks according to an embodiment, (a) for 16 bilayers and (b) for 64 bilayers.

A simulation was conducted to demonstrate the amount of reflectance provided by flakes containing varying numbers of bilayers. The simulation was performed using FilmStar modelling software. The calculated reflectance spectra at a normal incidences was determined for stacks containing polymethyl methacrylate ("PMMA") as Polymer 1 and polystyrene ("PS") as Polymer 2, and including three different bilayer thicknesses. The simulation results for the reflectivity of stacks with three different bilayer thicknesses are shown in FIG. 4. FIG. 4, graph (a) shows results for the case of 16 bilayers for each thickness, with a peak reflectivity of approximately 95% at the desired wavelength $\lambda_1$. FIG. 4, graph (b) shows that for 64 bilayers for each thickness, the peak reflectivity is approximately 100% for the desired wavelength $\lambda_1$.

The stack is preferably formed via co-extrusion. Stacks formed of bilayers, or multilayers of polymers can be prepared by using a multi-layer co-extrusion device, as known in the art, and described in, for example, U.S. Pat. Nos. 3,773,882 and 3,884,606, the disclosures of which are incorporated herein by reference.

In another embodiment of the invention, rather than co-extruding the polymer stacks, a preform is fabricated by taking sheets of polymers with thicknesses reflecting a constant multiple of the thicknesses in the final stack design and laminating them together using heat and pressure. This preform could then be drawn to the desired final thickness. This method would have the advantages of higher precision in layer thickness and better uniformity. In this case, bilayers are not restricted to having the same thickness t1 or t2 or thickness ratio, t1/t2, from one layer to the next. In fact, thickness and thickness ratio can be varied among layers, permitting more flexibility in designing the spectral properties of the stack.

Once the stack is formed, it is then comminuted to form flakes. Preferably, the formation of flakes is carried out via cryogenic grinding. In this procedure, the stack is cooled below −150° C. This may be accomplished by directly immersing the stack in liquid nitrogen or by cooling the grinding surfaces with liquid nitrogen. Then, the stack is ground into flakes with diameters in the range of 10 μm to 5 mm.

In another embodiment, comminution may be accomplished with a mortar and pestle. Additionally, any other methods of grinding or cutting are also acceptable for this purpose. These include, but are not limited to, grinding in a commercial cryogenic grinder or cutting with a sharp blade or a laser.

The flakes obtained from the comminuting process are then optionally sieved in order to separate out flakes in the size range of interest. The size of the flakes may be selected to provide the desired degree of alignment in the coating (larger flakes will have a tendency to exhibit greater alignment parallel to the coated surface). The presence of smaller flakes may be chosen based on the desired surface appearance; a greater concentration of small flakes may increase the diffuse reflectance of the surface (i.e. create a "matte" paint).

A number of flake parameters may impact the degree of alignment of the flakes in the final coating. Specifically, flake size, flake stiffness and flake thickness may impact the movement of flakes in the matrix material discussed below. The flake alignment may be altered to control the angular reflectance properties of the coating. Preferably, the larger dimension of the flakes, i.e. the dimension parallel to the interface between polymer layers, ranges in size from about 10 μm to 5 mm, and more preferably from 50 μm to about 500 μm. The flakes of the polymer film preferably have a reflectance of about 10% to 100% within a selected range of wavelengths.

The flakes are then dispersed by mixing or stirring them into the paint matrix, which is preferably a gloss polyurethane (PU) to form a composite. Any paint base that transmits in the wavelength(s) of interest can be used as the paint matrix. In addition to PU, suitable materials for the paint matrix may include, but are not limited to, latexes, acrylics, epoxy resins, and oil-based paint bases. Alternatively, instead of a paint base, a UV-curable epoxy may be used as the matrix, and instead of drying, this matrix is cured by polymerization via exposure to UV light. The choice of matrix may be dependent on the degree of flake alignment desired in the final coating. Using a matrix material with a different viscosity will alter the amount of flake motion and allows for tailoring the angular reflectance of the coating. Preferably, the matrix has at least 50% transmittance at wavelengths outside the selected wavelength range and more preferably a transmittance between about 80% and 100%.

Preferably, the composite contains between 0.001-50 weight % polymer flakes. More preferably, the composite contains between 0.01 and 10 weight % polymer flakes, and most preferably, the composite contains 0.1 weight % polymer flakes. The amount of polymer flakes utilized in the composite can be chosen to provide the desired peak reflectance and transmittance to the final coating while maintaining a suspension with the desired viscosity for application to a surface. Additionally, more than one type of flake having different designs and optical properties may be combined in the same matrix. Such a combination would provide a composite with a reflectance spectrum that is the result of the combination of each of the types of flakes.

The composite is applied to an opaque or transparent surface via painting, spray coating, or any other method consistent with the matrix used. Alignment occurs when the coating is painted onto the surface—then the flakes self-align to the surface because they may be larger in one dimension than the thickness of the paint. The alignment process is also affected by surface tension while the paint is drying. The surface tension may further align the flakes. Although each individual flake will not be completely aligned with the surface, the mean angle between the normal to the flake surface and the coating surface is <45°. If a paint matrix is used, the composite is allowed to dry, potentially with the assistance of heat, resulting in the final coating. If an epoxy matrix is used, the composite is cured, or otherwise hardened to form the final coating.

The application method for applying the composite to a surface may be selected to control the flake alignment within the composite. Moreover, the drying method may also be selected to control the degree of flake alignment in the final coating. For example, application of heat or blowing dry air may be used to alter the final flake alignment. As noted above, altering the degree of flake alignment within the composite may be used to tailor the angular reflectance properties of the final coating.

The coating preferably has a reflectance of at least 10% within a selected range of wavelengths and at least 50% transmittance at wavelengths outside the selected range.

The coating may also be applied on top of a traditional paint, and the resulting reflectance would be a combined effect from the two coatings. Additionally, multiple layers of the above coating could be applied to a surface. Each layer containing different flakes, or sets of flakes to achieve reflective properties that differ from those achieved using only a single layer of the disclosed coating alone.

Examples

Stacks of bilayers having PMMA as Polymer 1 and PS as Polymer 2 were fabricated and ground according to the procedure described above. It was desired that the reflectance was maximized at $\lambda_1$. Each stack comprised only one bilayer thicknesses. The thickness (t1) of the first polymer in the first bilayer was 59 nm, and the thickness (t2) of the second polymer in the first bilayer was 54 nm.

Figure 5:
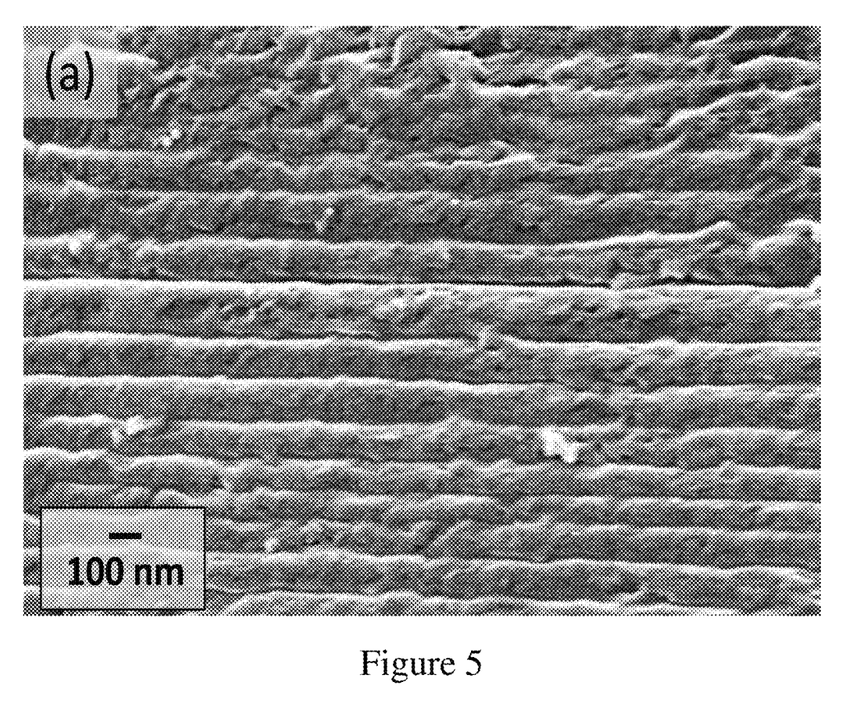
FIG. 5 is a scanning electron microscope image of a cross-section of an individual flake according to an embodiment of the invention.
Figure 6:
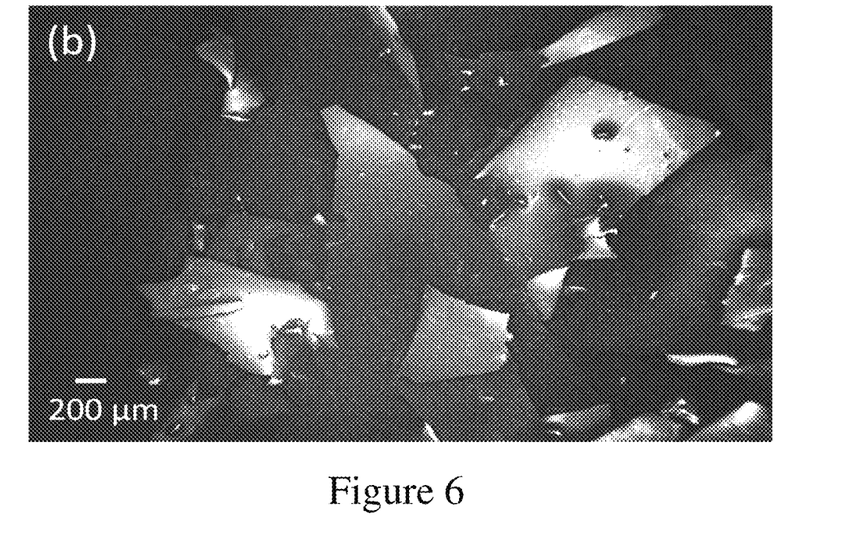
FIG. 6 is a scanning electron microscope image of a collection of flakes according to an embodiment of the invention.

The stack was ground into flakes via the cryogenic grinding process discussed above. FIG. 5 shows a scanning electron microscope (SEM) image of a cross-section of a flake made by this example, revealing multiple layers. FIG. 6 shows a scanning electron microscope (SEM) image of a collection of flakes of varying size. Flakes were then incorporated via stirring into a polyurethane matrix to form a composite and the composite was painted onto fused quartz wafers. The composite was allowed to dry at room temperature, and the spectral properties were characterized using a spectrophotometer with an integrating sphere.

Figure 7:
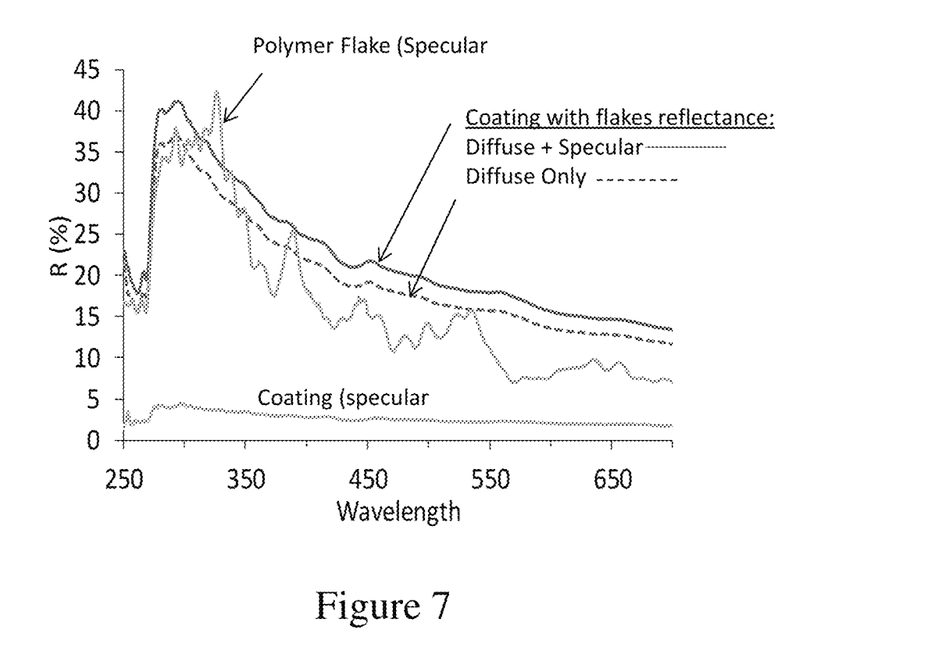
FIG. 7 is a graph showing the measured reflectance of a paint according to an embodiment of the invention.

FIG. 7 shows the film's reflective properties. One curve shows the specular reflectance of an individual flake prior to incorporation in the matrix. The reflectance of the flake peaks at a wavelength near 300 nm in the UV range. Another curve shows the total reflectance (specular plus diffuse) of the coating and substrate, while the dashed curve shows only the diffuse reflectance of the coating and substrate, and the lowermost curve shows the specular reflectance of the coating and substrate. It is clear that in this case, the majority of the reflected light is diffuse.

Figure 8:
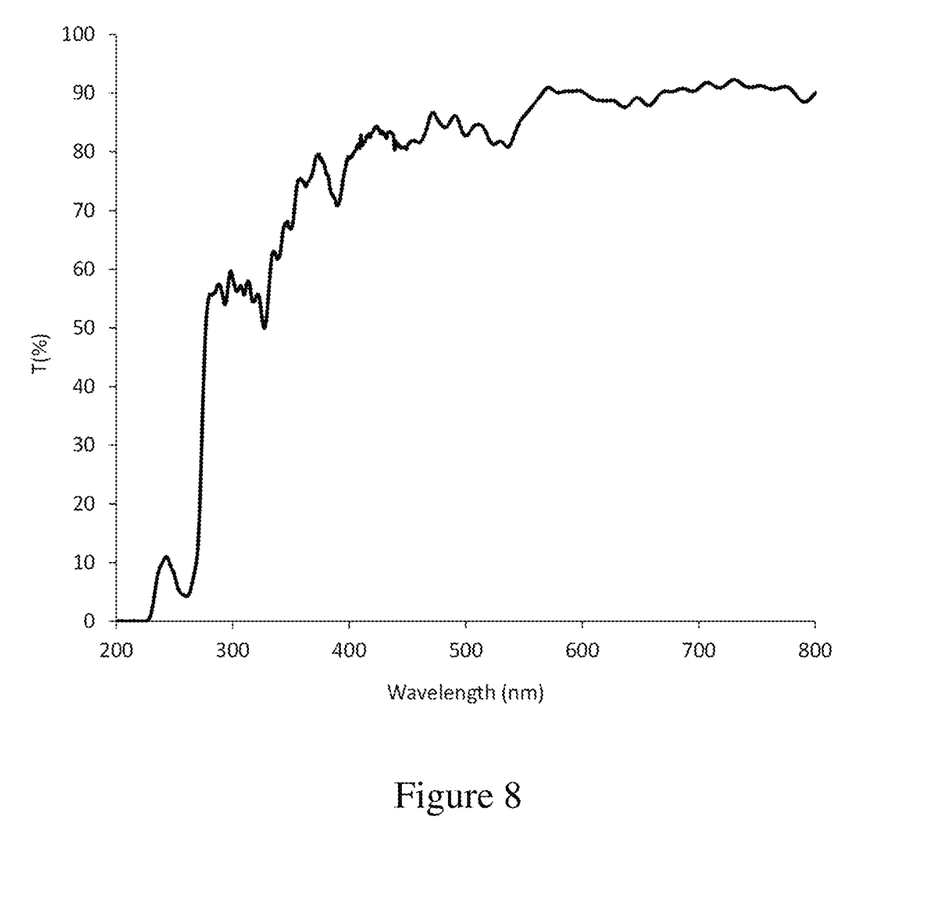
FIG. 8 is a graph showing the measured transmittance of the paint of FIG. 7.

FIG. 8 shows that the transmittance remains high, up to approximately 80%, outside of the reflective band near 300 nm. As such, the paint is shown to provide significant reflectance in the UV spectrum and good transmittance of wavelengths outside of the reflective wavelength range near 300 nm.

At numerous places throughout this specification, reference has been made to a number of U.S. Patents and other documents. All such cited documents are expressly incorporated in full into this disclosure as if fully set forth herein.

Other embodiments of the present disclosure will be apparent to those skilled in the art from consideration of the specification and practice of the embodiments disclosed herein. As used throughout the specification and claims, "a" and/or "an" may refer to one or more than one. Unless otherwise indicated, all numbers expressing quantities of ingredients, properties such as molecular weight, percent, ratio, reaction conditions, and so forth used in the specification and claims are to be understood as being modified in all instances by the term "about," whether or not the term "about" is present. Accordingly, unless indicated to the contrary, the numerical parameters set forth in the specification and claims are approximations that may vary depending upon the desired properties sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in their respective testing measurements. It is intended that the specification and examples be considered as exemplary only, with a true scope and spirit of the disclosure being indicated by the following claims.

The foregoing embodiments are susceptible to considerable variation in practice. Accordingly, the embodiments are not intended to be limited to the specific exemplifications set forth herein above. Rather, the foregoing embodiments are within the spirit and scope of the appended claims, including the equivalents thereof available as a matter of law.

The patentees do not intend to dedicate any disclosed embodiments to the public, and to the extent any disclosed modifications or alterations may not literally fall within the scope of the claims, they are considered to be part hereof under the doctrine of equivalents.

It is to be understood that each amount/value or range of amounts/values for each component, compound, substituent or parameter disclosed herein is to be interpreted as also being disclosed in combination with each amount/value or range of amounts/values disclosed for any other component(s), compounds(s), substituent(s) or parameter(s) disclosed herein and that any combination of amounts/values or ranges of amounts/values for two or more component(s), compounds(s), substituent(s) or parameters disclosed herein are thus also disclosed in combination with each other for the purposes of this description. It is further understood that each range disclosed herein is to be interpreted as a disclosure of each specific value within the disclosed range that has the same number of significant digits. Thus, a range of from 1-4 is to be interpreted as an express disclosure of the values 1, 2, 3 and 4.

It is further understood that each lower limit of each range disclosed herein is to be interpreted as disclosed in combination with each upper limit of each range and each specific value within each range disclosed herein for the same component, compounds, substituent or parameter. Thus, this disclosure to be interpreted as a disclosure of all ranges derived by combining each lower limit of each range with each upper limit of each range or with each specific value within each range, or by combining each upper limit of each range with each specific value within each range.

Furthermore, specific amounts/values of a component, compound, substituent or parameter disclosed in the description or an example is to be interpreted as a disclosure of either a lower or an upper limit of a range and thus can be combined with any other lower or upper limit of a range or specific amount/value for the same component, compound, substituent or parameter disclosed elsewhere in the application to form a range for that component, compound, substituent or parameter.

What is claimed is:

1. A composite having engineered reflective properties comprising:
   a matrix, and
   flakes of a multilayer polymer film including one or more bilayers, each said bilayer including at least a layer of a first polymer and a layer of a second polymer and wherein said first polymer has a different refractive index than the second polymer.

2. The composite of claim 1, wherein the multilayer polymer films comprise from one to about 1024 bilayers.

3. The composite of claim 1, wherein an optical thickness of each polymer layer is from about 10% to about 50% of the wavelength at which peak reflectance is desired.

4. The composite of claim 1, wherein the polymer film further comprises a support layer having a thickness between 0.5 µm and 100 µm.

5. The composite of claim 1, wherein the first polymer and the second polymer comprise one or more of: polymethyl methacrylate, polystyrene, polyvinylidene fluoride, polycarbonate, and polyethylene.

6. The composite of claim 1, wherein the first polymer is polymethyl methacrylate and the second polymer is polystyrene.

7. The composite of claim 1, wherein the matrix is a paint base, or a UV-curable epoxy.

8. The composite of claim 7, wherein the paint base is a gloss polyurethane.

9. The composite of claim 2, wherein the thickness of each said polymer layer of one said bilayer is different from the thickness of each said polymer layer of another said bilayer.

10. The composite of claim 9, wherein at least three said bilayers include polymer layers of different thicknesses.

11. The composite of claim 9, wherein for one said bilayer the first thickness is equal to t1 and the second thickness is equal to t2, and for another said second bilayer the first thickness is equal to a*t1 and the second thickness is equal to a*t2, wherein a is a value other than 1.0 between 0.5 and 1.5.

12. The composite of claim 11, wherein for a third said bilayer the first thickness is equal to b*t1 and the second thickness is equal to b*t2, wherein b is not equal to a, and b is a value other than 1.0 between 0.5 and 1.5.

13. The composite of claim 1, wherein the flakes of polymer film have a reflectance of at least 10% within a selected range of wavelengths and the matrix has at least a 50% transmittance outside of the selected range of wavelengths.

14. A coating formed by application of the composite of claim 1 to a surface, said coating comprising the matrix and the flakes of multilayer polymer film, wherein the coating has a reflectance of at least 10% for a selected wavelength range and a transmittance of at least 50% at wavelengths outside of the selected wavelength range.

15. The coating of claim 14, wherein the selected wavelength range is in the UV spectrum.

16. The coating of claim 14, wherein a mean angle of alignment of the flakes with an outer surface of the coating is less than 45°.

17. The coating of claim 14, comprising multiple different types of polymer flakes.

18. A method of forming a composite having engineered reflective properties comprising steps of:
   a. forming a stack or polymer film comprised of one to about 1024 bilayers of a first polymer having a first refractive index and a second polymer having a second refractive index different from said first refractive index;
   b. comminuting the stack or film to form flakes;
   c. dispersing the flakes in a matrix.

19. The method of claim 18 further comprising:
   b.1 sieving the flakes to obtain only flakes within a desired size range, wherein step b.1 occurs after step b.

20. The method of claim 18, wherein for a first bilayer the first thickness is equal to t1 and the second thickness is equal to t2, and for a second bilayer the first thickness is equal to a*t1 and the second thickness is equal to a*t2, wherein a has a value other than 1.0 between 0.5 and 1.5.

21. A method of forming a coating comprising the steps of the method of claim 18, and further comprising steps of:
   f. applying the composite to a surface; and
   g. drying or curing the matrix to form a coating.

22. The method of claim 21, wherein applying is painting or spraying.

23. The method of claim 21, wherein a mean angle of alignment of the flakes with an outer surface of the coating is less than 45°.

* * * * *